(12) United States Patent
Ishidoya

(10) Patent No.: US 9,721,197 B2
(45) Date of Patent: Aug. 1, 2017

(54) CONTROL DEVICE AND CONTROL METHOD

(71) Applicant: Seiko Instruments Inc., Chiba-shi, Chiba (JP)

(72) Inventor: Yohei Ishidoya, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 0 days.

(21) Appl. No.: 15/155,534

(22) Filed: May 16, 2016

(65) Prior Publication Data

US 2016/0342871 A1 Nov. 24, 2016

(30) Foreign Application Priority Data

May 18, 2015 (JP) .................................. 2015-101395

(51) Int. Cl.
| | |
|---|---|
| *G06K 15/00* | (2006.01) |
| *G06K 15/02* | (2006.01) |
| *B26D 5/34* | (2006.01) |
| *B26D 1/08* | (2006.01) |

(52) U.S. Cl.
CPC ......... *G06K 15/4025* (2013.01); *B26D 1/085* (2013.01); *B26D 5/34* (2013.01); *G06K 15/02* (2013.01)

(58) Field of Classification Search
USPC ....................................................... 358/1.15
See application file for complete search history.

(56) References Cited

U.S. PATENT DOCUMENTS

| | | | | | |
|---|---|---|---|---|---|
| 3,912,193 | A | * | 10/1975 | Calvaer | B65H 23/0328 226/20 |
| 5,999,773 | A | * | 12/1999 | Yasutomi | G03G 15/0225 399/100 |
| 6,065,397 | A | * | 5/2000 | Sato | B41F 21/05 101/118 |
| 9,354,554 | B2 | * | 5/2016 | Sadamitsu | G03G 21/105 |
| 2011/0217108 | A1 | | 9/2011 | Imamura et al. | |
| 2015/0261127 | A1 | * | 9/2015 | Fujishima | G03G 15/0907 399/55 |

FOREIGN PATENT DOCUMENTS

JP 2011-178147 A 9/2011

\* cited by examiner

*Primary Examiner* — Jerome Grant, II
(74) *Attorney, Agent, or Firm* — Brinks Gilson & Lione

(57) ABSTRACT

A control device comprises: a movement control unit configured to control movement of an object; a detecting unit configured to optically detect, at a specific position, the object moving through control by the movement control unit, to thereby output a detection voltage; and a movement amount determining unit configured to determine a movement amount of the object to be moved through the control by the movement control unit, based on a tendency of a change in the detection voltage when the object is moved.

7 Claims, 8 Drawing Sheets

| THRESHOLD VALUE | VOLTAGE (AD VALUE) |
|---|---|
| TV_1 | 240 |
| TV_2 | 190 |
| TV_3 | 140 |
| TV_4 | 20 |
| TV_H | 128 |

FIG.7

| RANK | DETERMINATION CONDITION |
|---|---|
| RANK_A | NUMBER OF DRIVE STEPS IN DETECTION VOLTAGE RANGE OF THRESHOLD VALUE_4 OR MORE AND LESS THAN THRESHOLD VALUE_3 IS DEFINED VALUE OR MORE |
| RANK_B | NUMBER OF DRIVE STEPS IN DETECTION VOLTAGE RANGE OF THRESHOLD VALUE_3 OR MORE AND LESS THAN THRESHOLD VALUE_2 IS DEFINED VALUE OR MORE |
| RANK_C | NUMBER OF DRIVE STEPS IN DETECTION VOLTAGE RANGE OF THRESHOLD VALUE_2 OR MORE AND LESS THAN THRESHOLD VALUE_1 IS DEFINED VALUE OR MORE, OR DETECTION VOLTAGE IS THRESHOLD VALUE_1 OR MORE UNDER CUTTER STOPPED STATE |

FIG.8

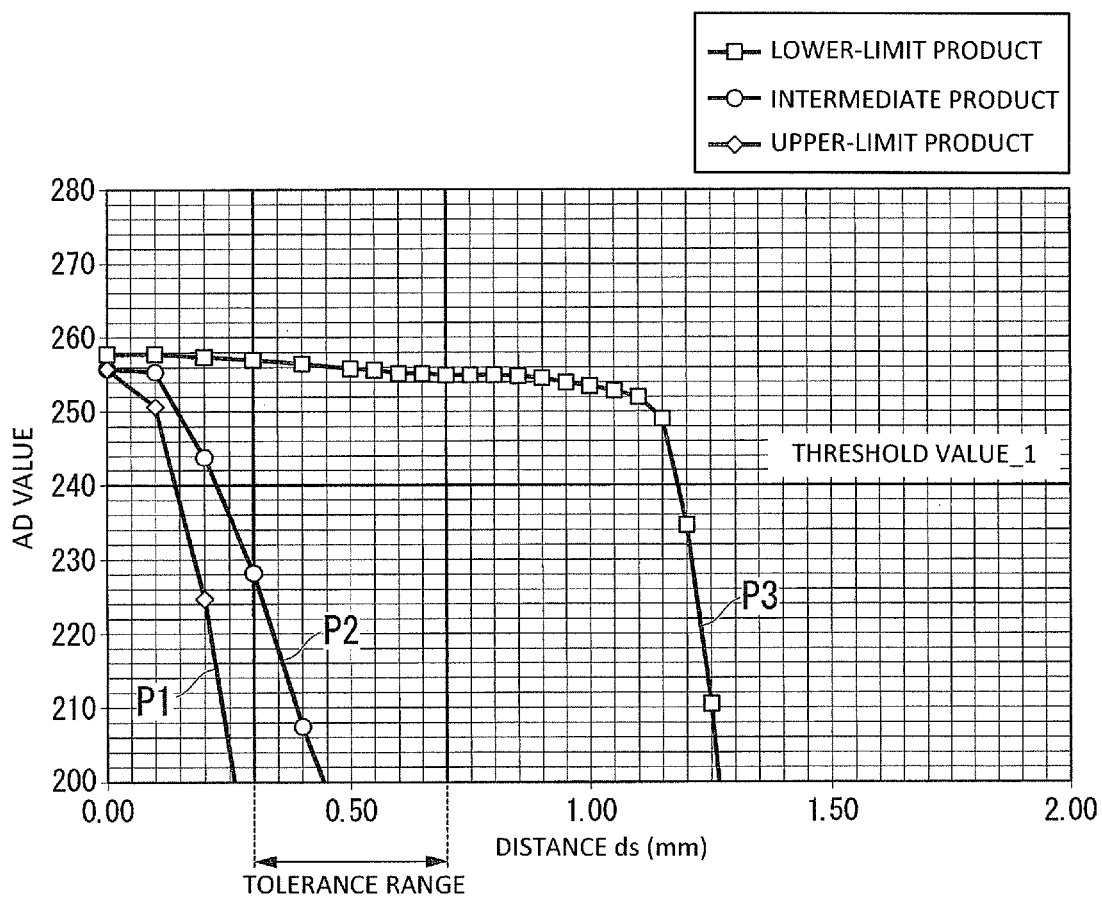

CONTROL DEVICE AND CONTROL METHOD

RELATED APPLICATIONS

This application claims priority under 35 U.S.C. §119 to Japanese Patent Application No. 2015-101395 filed on May 18, 2015, the entire content of which is hereby incorporated by reference.

BACKGROUND OF THE INVENTION

1. Field of the Invention

The present invention relates to a control device configured to control movement of an object, and to a control method for the control device. More particularly, the present invention relates to a control device configured to perform correction processing in a printer or other devices based on a tendency of a change in detection voltage of an optical sensor, and to a control method for the control device.

2. Description of the Related Art

Hitherto, a printer device includes a sensor configured to optically detect presence or absence of a sheet, a sheet position mark, a cutter stop position, or the like (for example, an optical sensor including a light emitting portion and a light receiving portion configured to receive light from the light emitting portion to output a detection voltage based on the amount of the received light). The printer device is configured to recognize the position of the sheet or the cutter or to change a printer status based on the detection result of the above-mentioned sensor. For example, the printer device is configured to determine the position of the sheet or the cutter by comparing the detection voltage being the detection result of the sensor and a threshold value set in advance to each other.

The detection accuracy of the sensor is dependent on an individual variation (light emission intensity, light receiving sensitivity, or the like) of the sensor, but the individual variation may not be defined depending on products. In this case, the individual variation may be significantly large, and thus the detection accuracy may be remarkably reduced. It is conceivable to employ a method of selecting products having small individual variations, but the cost increases as compared to the undefined products.

Based on the points described above, in the technical field, there have been demands for a control device and a control method capable of suppressing reduction in detection accuracy even when a sensor having a large individual variation is used.

SUMMARY OF THE INVENTION

According to one embodiment of the present invention, there is provided a control device, comprising: a movement control unit configured to control movement of an object; a detecting unit configured to optically detect, at a specific position, the object moving through control by the movement control unit, to thereby output a detection voltage; and a movement amount determining unit configured to determine a movement amount of the object to be moved through the control by the movement control unit, based on a tendency of a change in the detection voltage when the object is moved.

The control device according to the another embodiment of the present invention further comprises a measuring unit configured to measure the detection voltage output from the detecting unit based on the movement of the object, while the object is moved for a predetermined distance through the control by the movement control unit, wherein the movement amount determining unit is configured to determine a distance for moving the object as the movement amount based on the tendency of the change in the detection voltage for the predetermined distance, which is measured by the measuring unit.

The control device according to the another embodiment of the present invention further comprises a measuring unit configured to measure the detection voltage output from the detecting unit based on the movement of the object, while the object is moved for a predetermined time through the control by the movement control unit, wherein the movement amount determining unit is configured to determine a time for moving the object as the movement amount based on the tendency of the change in the detection voltage for the predetermined time, which is measured by the measuring unit.

In the control device according to the another embodiment of the present invention, when the detection voltage crosses a predetermined threshold value while the object is moving, the movement amount determining unit determines a subsequent movement amount based on the tendency of the change in the detection voltage.

In the control device according to the another embodiment of the present invention, for the detecting unit, a rank based on the tendency of the change in the detection voltage and a correction amount of the movement amount until the object is stopped are set in association with each other, and wherein the movement amount determining unit is configured to: determine the rank of the detecting unit based on the tendency of the change in the detection voltage; and determine the movement amount until the object is stopped based on the correction amount associated with the determined rank.

In the control device according to the another embodiment of the present invention, when one of a predetermined command and test printing is executed, the movement amount determining unit determines the movement amount of the object to be moved through the control by the movement control unit, based on the tendency of the change in the detection voltage when the object is moved.

According to another embodiment of the present invention, there is provided a control method for a control device, the control method comprising: a movement control step of controlling, by a movement control unit, movement of an object; a measuring step of acquiring, by a measuring unit, a detection voltage output from a detecting unit configured to optically detect, at a specific position, the object configured to move through control by the movement control unit; and a movement amount determining step of determining, by a movement amount determining unit, a movement amount of the object to be moved through the control by the movement control unit, based on a tendency of a change in the detection voltage when the object is moved.

As described above, according to the one embodiment of the present invention, the control device and the control method capable of suppressing reduction in detection accuracy even when a sensor having a large individual variation is used are provided.

BRIEF DESCRIPTION OF THE DRAWINGS

FIG. 7 is a data example of a rank determining table.

FIG. 8 is a graph for showing a first example of an individual variation of a detection voltage of a PI sensor.

DETAILED DESCRIPTION OF THE PREFERRED EMBODIMENTS

Now, an embodiment of the present invention is described with reference to the accompanying drawings.

Figure 1:
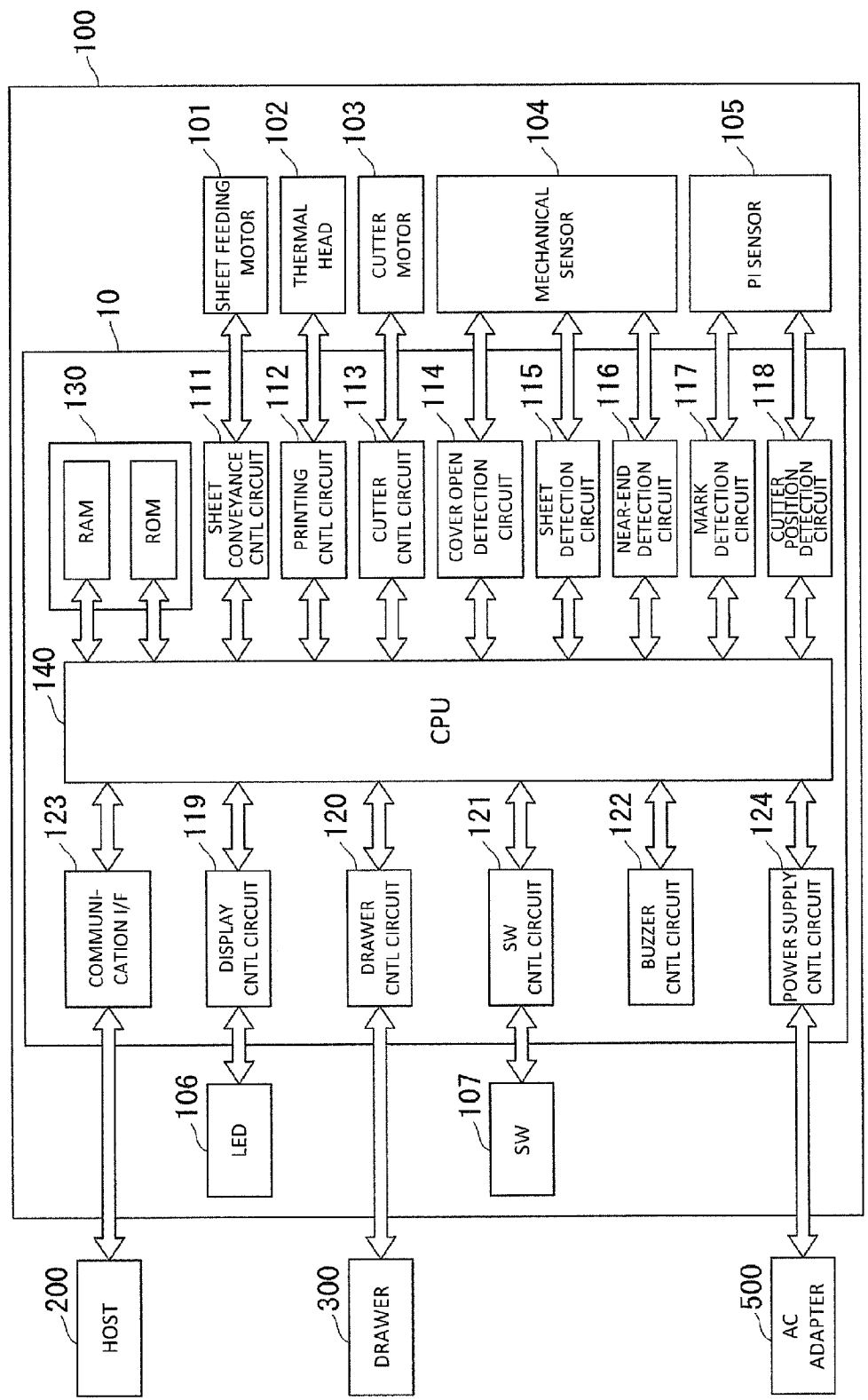
FIG. 1 is a block diagram for illustrating an example of a hardware configuration of a printer device according to an embodiment of the present invention.

FIG. 1 is a block diagram for illustrating an example of a hardware configuration of a printer device 100 according to this embodiment. In FIG. 1, an electrical configuration is mainly illustrated. The printer device 100 is connected to a host device 200 (POS terminal) and a drawer 300. The host device 200 includes, for example, an input key for use to input a product name, price, and the like, and an operation key for use to perform various settings of a POS system. Further, the host device 200 is configured to transmit, to the printer device 100, a control command for instructing the printer device 100 to issue a receipt, or to open or close the drawer 300. The drawer 300 is a cash drawer configured to temporarily store cash.

The printer device 100 (example of a control device) is configured to, for example, issue a receipt based on the control command from the host device 200. The printer device 100 includes a circuit board 10 having various circuits and ICs mounted thereon, a sheet feeding motor 101 configured to drive a mechanism configured to convey a print sheet, a thermal head 102 configured to perform printing on a sheet, a cutter motor 103 configured to drive a cutter configured to cut the sheet, a mechanical sensor 104 configured to mechanically detect each of opening or closing of a cover configured to cover the printer device 100, presence or absence of the sheet, the near-end of the sheet, and the like, a PI sensor 105 configured to optically detect a position of the cutter or a position (mark) of the sheet, an LED 106 configured to turn on or off for notification of the status of the printer device 100, and a switch (SW) 107.

The circuit board 10 has mounted thereon a sheet conveyance control circuit 111, a printing control circuit 112, a cutter control circuit 113, a cover open detection circuit 114, a sheet detection circuit 115, a near-end detection circuit 116, a mark detection circuit 117, a cutter position detection circuit 118, a display control circuit 119, a drawer control circuit 120, a SW control circuit 121, a buzzer control circuit 122, a communication interface 123, a power supply control circuit 124, a memory 130, and a CPU 140.

The sheet conveyance control circuit 111 is controlled by the CPU 140 to drive the sheet feeding motor 101, to thereby control the conveyance of the print sheet. The printing control circuit 112 is controlled by the CPU 140 to control the drive of the thermal head 102 configured to perform printing on a sheet (receipt). The cutter control circuit 113 is controlled by the CPU 140 to drive the cutter motor 103, to thereby move the cutter to any one of a stopping position at which the sheet is not cut and a cutting position at which the sheet is cut. For example, the cutter control circuit 113 normally moves the cutter to the stopping position, and moves the cutter to the cutting position when the receipt is cut, to thereby cut the printed receipt at a predetermined position. The cover open detection circuit 114 is configured to detect opening or closing of the cover configured to cover the printer device 100 via the mechanical sensor 104. The sheet detection circuit 115 is configured to detect presence or absence of the sheet via the mechanical sensor 104. The near-end detection circuit 116 is configured to detect the near-end of the sheet via the mechanical sensor 104.

The mark detection circuit 117 is configured to detect the position of the mark included in the sheet (that is, the position of the sheet) via the PI sensor 105. The cutter position detection circuit 118 is configured to detect the position (for example, the stopping position) of the cutter being driven by the cutter motor 103 via the PI sensor 105. The display control circuit 119 is controlled by the CPU 140 to turn on or off the LED 106 based on the status of the printer device 100. For example, the LED 106 includes a plurality of light emitting diodes (LEDs) having lighting colors of red, green, and the like.

The drawer control circuit 120 is controlled by the CPU 140 to output, to the drawer 300, a control signal for controlling opening or closing of the drawer 300. The SW control circuit 121 is configured to output, to the CPU 140, a voltage value based on the operation state of the switch (SW) 107 as an operation signal representing the operation state. The buzzer control circuit 122 includes a buzzer configured to emit a sound by vibrating a vibration plate with use of an electromagnet, and is controlled by the CPU 140 to output a notification sound or a warning sound based on the status of the printer device 100.

The communication interface 123 is connected for communication to the host device 200, and is configured to receive data input from the host device 200 and to output a control command included in the data input to the CPU 140. The power supply control circuit 124 is connected to an AC adapter 500, and is configured to convert power input from the AC adapter 500 into a predetermined voltage, to thereby feed the voltage to each unit included in the printer device 100. The AC adapter 500 is connected to a commercial power supply, and is configured to covert the power supplied from the commercial power supply into power in a type conforming to the printer device 100, to thereby output the power.

The memory 130 includes, as a storage medium, for example, a read-only memory (ROM) and a random access memory (RAM). The memory 130 may include a hard-disk drive (HDD), a flash memory, and the like. For example, the memory 130 is configured to store a program to be executed by the CPU 140 and data that is required when the CPU 140 executes the program.

The CPU 140 includes a central processing unit (CPU), and is configured to read and execute programs and various data stored in the memory 130, to thereby control each unit of the printer device 100.

Even when the individual variation of the PI sensor 105 is large, the printer device 100 according to this embodiment is capable of suppressing reduction in detection accuracy by performing correction based on the individual variation. In this embodiment, description is given of a case where movement control of the cutter configured to move by the drive of the cutter motor 103 is subjected to correction based on the individual variation.

Figure 2:
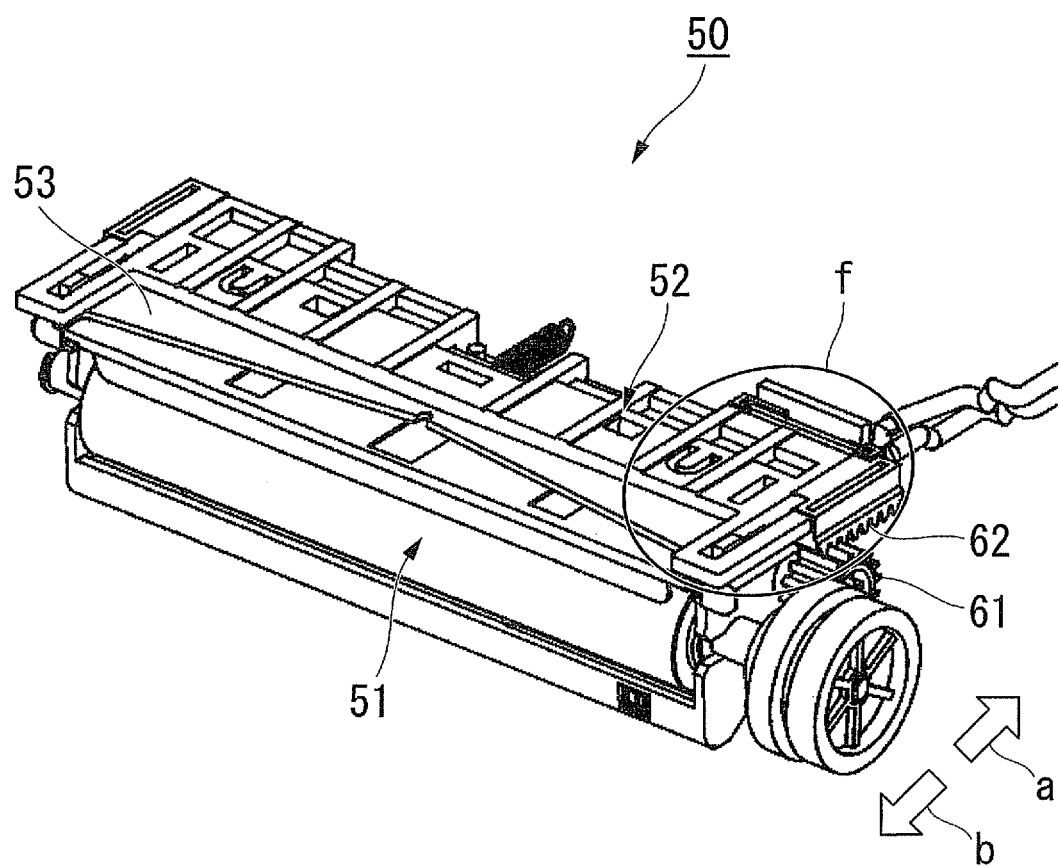
FIG. 2 is a perspective view for illustrating an entire structure of a cutter unit according to this embodiment.

First, with reference to FIG. 2, the structure of a cutter unit 50 included in the printer device 100 according to this embodiment is described. FIG. 2 is a perspective view for illustrating the entire structure of the cutter unit 50 according to this embodiment. The cutter unit 50 includes a platen 51 configured to convey the sheet, a cutter holder unit 52 including a cutter 53 configured to cut the sheet conveyed by the platen 51, and a cutter gear 61 configured to move the cutter holder unit 52. The platen 51 is driven by the sheet feeding motor 101 to convey the sheet pulled out from roll paper in a rolled state, press the sheet against the thermal head 102 illustrated in FIG. 1 (not shown in FIG. 2), and deliver the sheet outside a casing of the printer device 100. The cutter holder unit 52 includes the cutter 53 as a movable blade extending in the width direction of the sheet, and is configured to cut the sheet delivered outside the casing at a predetermined position in the width direction of the sheet. As illustrated in FIG. 2, the cutter holder unit 52 includes a rack 62 configured to mesh with the cutter gear 61. When the cutter gear 61 is rotated positively or reversely by the drive of the cutter motor 103, the cutter holder unit 52 and the cutter 53 are accordingly moved in the direction of the arrow a or the direction of the arrow b.

Figure 3:
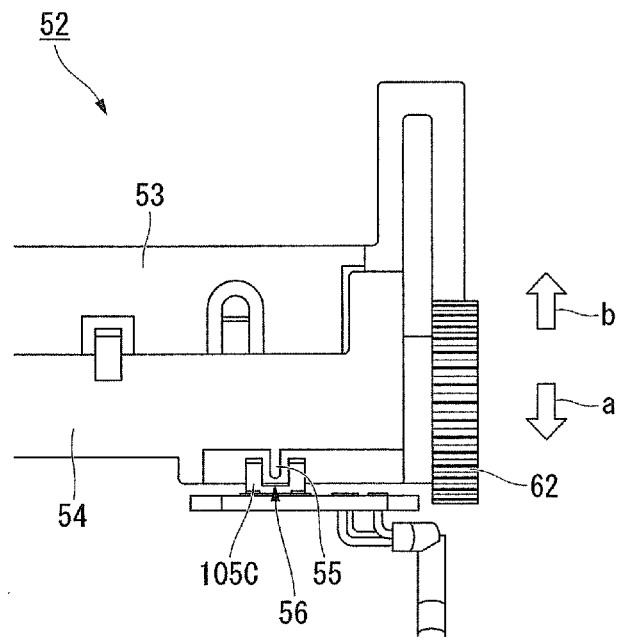
FIG. 3 is a view for illustrating details of a position detecting mechanism for a cutter.

FIG. 3 is a view for illustrating details of a position detecting mechanism for the cutter 53. FIG. 3 is a view of a part represented by symbol f of the cutter holder unit 52 illustrated in FIG. 2 as viewed from the lower side. The directions of the arrows a and b in FIG. 3 correspond to the directions of the arrows a and b in FIG. 2, respectively. The cutter 53 is fixed to a cutter holding portion 54. Through the drive of the cutter motor 103, the cutter 53 and the cutter holding portion 54 are integrally moved in the direction of the arrow a and in the direction of the arrow b. In this case, the direction of the arrow a is the direction in which the cutter 53 is moved toward the stopping position, and the direction of the arrow b is the direction in which the cutter 53 is moved toward the cutting position (direction of separating away from the stopping position).

Further, the cutter holding portion 54 includes a projecting portion 55 as a part of the position detecting mechanism for the cutter 53. Besides, the cutter holder unit 52 includes a PI sensor 105C (one of the PI sensors 105 for cutter position detection is referred to as "PI sensor 105C" for distinction) having a recessed portion 56 as a part of the position detecting mechanism for the cutter 53. The recessed portion 56 of the PI sensor 105C is arranged at a position at which the projecting portion 55 is inserted when the cutter 53 is moved to the stopping position. The PI sensor 105C is a sensor (hereinafter also referred to as "optical sensor") configured to optically detect the projecting portion 55 inserted into the recessed portion 56. For example, the PI sensor 105C is a transmissive optical sensor including a light emitting portion and a light receiving portion configured to receive light from the light emitting portion, and being configured to output a detection voltage based on the amount of the received light, which changes depending on whether or not the light from the light emitting portion is blocked by the projecting portion 55.

Figure 4:
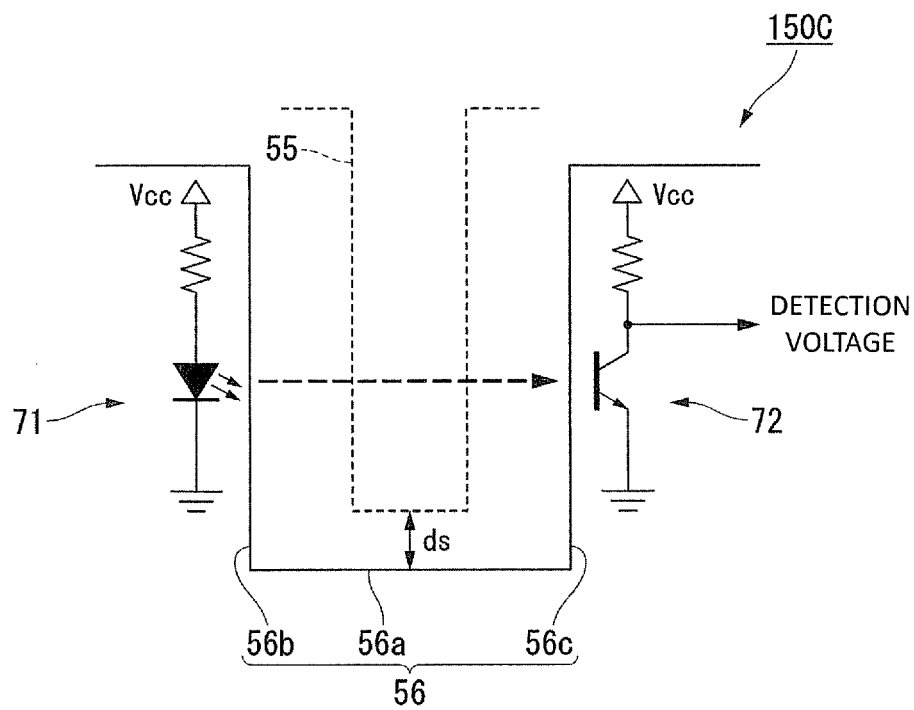
FIG. 4 is a schematic view for illustrating a circuit of a PI sensor and a shape of a recessed portion.

FIG. 4 is a schematic view for illustrating the circuit of the PI sensor 105C and the shape of the recessed portion 56. On opposing side surfaces 56b and 56c of the recessed portion 56, a light emitting portion 71 and a light receiving portion 72 of the PI sensor 105C are formed, respectively. The light emitting portion 71 includes, for example, a light emitting diode (LED). The light receiving portion 72 includes, for example, a phototransistor. When the projecting portion 55 is not inserted into the recessed portion 56, the light from the light emitting portion 71 reaches the light receiving portion 72 without being blocked, and as the projecting portion 55 is gradually inserted into the recessed portion 56, the light from the light emitting portion 71 is gradually blocked, and thus the amount of light received by the light receiving portion 72 is reduced. The detection voltage of the PI sensor 105C is increased as the amount of light received by the light receiving portion 72 is decreased, and is decreased as the amount of light received by the light receiving portion 72 is increased. Further, the output of the detection voltage of the PI sensor 105C is input to, for example, an AD port of the CPU 140. The AD port is an input port configured to convert the analog value (for example, 0 V to 3.3 V) of the input voltage into a digital value (for example, 0 to 255) to acquire the digital value. The value obtained by converting the analog value into the digital value is also referred to as "AD value".

When the projecting portion 55 is most inserted into the recessed portion 56, the cutter 53 is located at the stopping position, but the projecting portion 55 is controlled to stop at a position slightly short of the bottom so as to prevent the projecting portion 55 from colliding against the recessed portion 56. A distance ds between the projecting portion 55 when the cutter 53 is located at the stopping position and a deepest surface 56a of the recessed portion 56 has a predetermined tolerance range (for example, 0.3 mm to 0.7 mm) due to the dimensional variation or assembly error of each component depending on products.

Figures 5, 6:
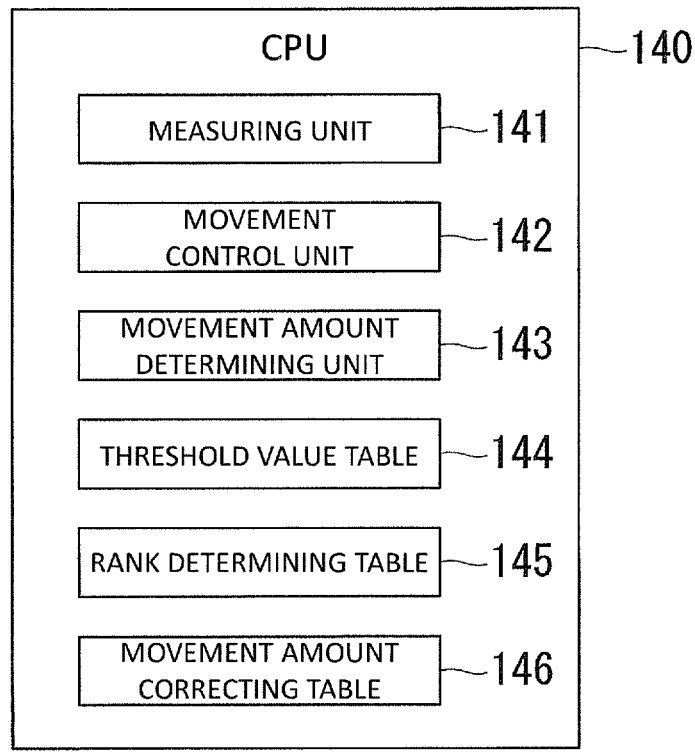
FIG. 5 is a block diagram for illustrating an example of the functional configurations of the printer device according to this embodiment.
FIG. 6 is a data example of a threshold value table.

Next, description is given of functional configurations of the printer device 100 configured to perform correction based on the individual variation of the PI sensor 105C in cutter movement control processing for moving the position of the cutter 53. FIG. 5 is a block diagram for illustrating an example of the functional configurations of the printer device 100 according to this embodiment. The printer device 100 includes, as the functional configurations to be executed by the CPU 140 based on the program and data stored in the memory 130, a measuring unit 141, a movement control unit 142, and a movement amount determining unit 143.

The measuring unit 141 is configured to measure the detection voltage output from the PI sensor 105C. For example, the measuring unit 141 is configured to read, via the AD port, the AD value of the detection voltage output from the PI sensor 105C. The measuring unit 141 may be configured to store the AD value of the read detection voltage in the memory 130 as necessary.

The movement control unit 142 is configured to output, to the cutter control circuit 113, a control signal for moving the cutter 53, to thereby control the movement of the cutter 53. For example, the cutter motor 103 is a stepping motor. The movement control unit 142 is configured to output, to the cutter control circuit 113, a control signal based on a drive rotation direction of the cutter motor 103 and the number of drive steps of the cutter motor 103. With this, the movement control unit 142 controls the moving direction (direction toward the stopping position or direction toward the cutting position) and the moving amount of the cutter 53.

The movement amount determining unit 143 is configured to determine the movement amount of the cutter 53, which is controlled by the movement control unit 142, based on the detection voltage of the PI sensor 105C, which is measured by the measuring unit 141. In this case, the characteristic of the detection voltage of the PI sensor 105C has an individual variation. As a result, the tendency of the change in detection voltage when the cutter 53 is moved becomes a tendency based on the characteristic of the individual PI sensor 105C. In view of this, the movement amount determining unit 143 determines the movement amount of the cutter 53 to be moved through the control by the movement control unit 142, based on the tendency of the change in detection voltage when the cutter 53 is moved.

For example, for the PI sensor 105C, a rank based on the tendency of the change in detection voltage and a correction amount of the movement amount of the cutter 53 are set in advance in association with each other. The movement amount determining unit 143 is configured to determine the rank of the PI sensor 105C based on the tendency of the change in detection voltage, and to determine the movement amount of the cutter 53 based on the correction amount associated with the determined rank. As described above, the printer device 100 is configured to correct the movement amount based on the rank depending on the individual variation of the PI sensor 105C, and hence even when the individual variation of the PI sensor 105C is large, the reduction in detection accuracy can be suppressed.

Further, inside the CPU 140, as data to be used when the PI sensor 105C is ranked, and as data of the correction amount, a threshold value table 144, a rank determining table 145, and a movement amount correcting table 146 are stored. Instead of being stored inside the CPU 140, those pieces of data may be stored in, for example, the memory 130 provided outside the CPU 140.

FIG. 6 is a data example of the threshold value table 144. In the threshold value table 144, threshold values 1 to 4 of the detection voltage, which are used when the rank of the PI sensor 105C is determined, are set as AD values. In the example shown in FIG. 6, the AD value of the threshold value 1 is set to "240", the AD value of the threshold value 2 is set to "190", the AD value of the threshold value 3 is set to "140", and the AD value of the threshold value 4 is set to "20". Further, in the threshold value table 144, a threshold value H of a voltage for determining the level (high or low level) of the detection voltage of the PI sensor 105C is set and stored as an AD value. In the example shown in FIG. 6, the voltage of the threshold value H is set to "128".

FIG. 7 is a data example of the rank determining table 145. In the rank determining table 145, determination conditions of the ranks depending on the individual variation of the PI sensor 105C are set. In the example shown in FIG. 7, the determination condition for determination as a rank A resides in a case where, when the cutter 53 is moved, the number of drive steps in a detection voltage range of the threshold value 4 or more and less than the threshold value 3 is a defined value or more. The determination condition for determination as a rank B resides in a case where, when the cutter 53 is moved, the number of drive steps in a detection voltage range of the threshold value 3 or more and less than the threshold value 2 is the defined value or more. The determination condition for determination as a rank C resides in a case where, when the cutter 53 is moved, the number of drive steps in a detection voltage range of the threshold value 2 or more and less than the threshold value 1 is the defined value or more, or a case where the detection voltage is the threshold value 1 or more under a state in which the cutter 53 is stopped at the stopping position. In this case, the defined value refers to a defined value of the movement amount of the cutter 53 (in this case, the number of drive steps) (for example, 5 steps). For the AD values of the threshold values 1 to 4, the AD values set in the threshold value table 144 of FIG. 6 are used.

Figure 9:
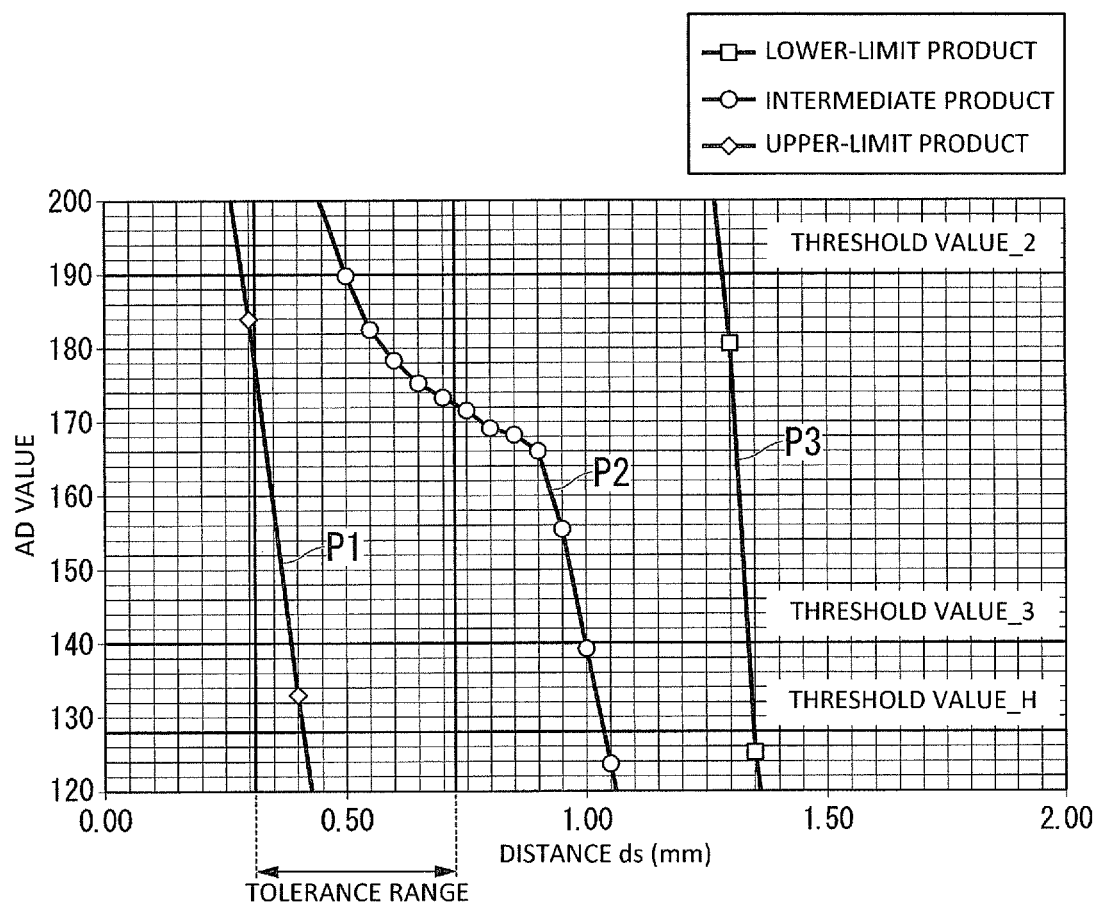
FIG. 9 is a graph for showing a second example of the individual variation of the detection voltage of the PI sensor.
Figures 10, 11:
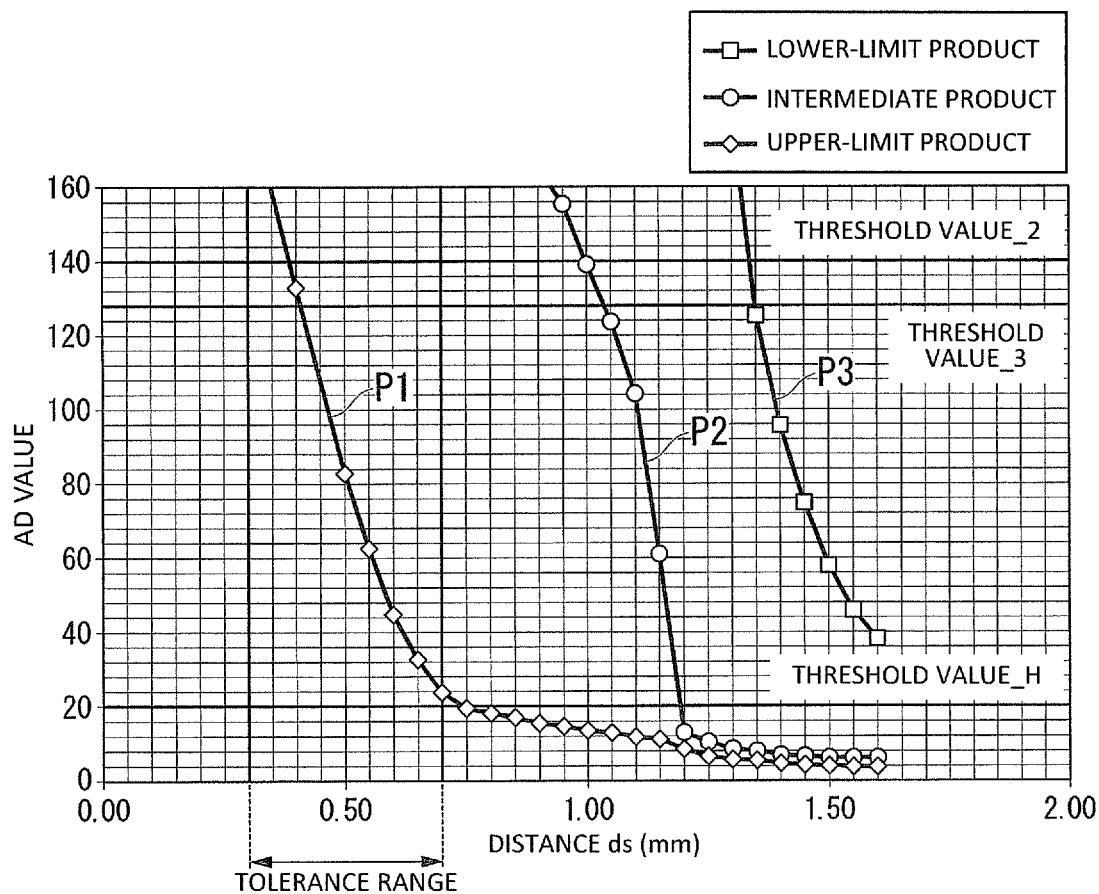
FIG. 10 is a graph for showing a third example of the individual variation of the detection voltage of the PI sensor.
FIG. 11 is a data example of a movement amount correcting table.

Now, with reference to FIG. 8, FIG. 9, and FIG. 10, the individual variation of the detection voltage of the PI sensor 105C and determination on the rank of the PI sensor 105C are described. FIG. 8, FIG. 9, and FIG. 10 are graphs for showing an example of the individual variation of the detection voltage of the PI sensor 105C, and for showing the change in detection voltage of the PI sensor 105C when the cutter 53 is moved from the stopping position in the direction of the cutting position. FIG. 8 is a graph in the vicinity of the threshold value 1, FIG. 9 is a graph in the vicinity of the threshold values 2 and 3, and FIG. 10 is a graph in the vicinity of the threshold values 3 and 4.

Further, in FIG. 8, FIG. 9, and FIG. 10, the vertical axis represents the AD value of the detection voltage, and the lateral axis represents the distance ds (mm) from the deepest surface 56a of the recessed portion 56 of the PI sensor 105C to the projecting portion 55. A tolerance range dh (mm) is a tolerance range of the distance ds when the cutter 53 reaches the stopping position (for example, 0.3 mm to 0.7 mm). Further, each of the threshold values (threshold values 1 to 4 and threshold value H) is a threshold value set in the threshold value table 144 shown in FIG. 6.

Each of the lines denoted by reference symbol P1, reference symbol P2, and reference symbol P3 represents an example of the change in detection voltage of each of an upper-limit product, an intermediate product, and a lower-limit product of the PI sensor 105C, and the detection voltages of the respective steps within the distance ds=0 mm to 1.6 mm are plotted in the graphs. The upper-limit product refers to an individual having a high light receiving sensitivity. Even when the projecting portion 55 is gradually inserted into the recessed portion 56 due to the approach of the cutter 53 to the stopping position, and thus the amount of light reaching the light receiving portion 72 from the light emitting portion 71 is reduced, because the upper-limit product has a high light receiving sensitivity, the light receiving amount is not reduced. Thus, the upper-limit product is an individual whose detection voltage hardly increases (hardly exceeds the threshold value H). On the other hand, the lower-limit product refers to an individual having a low light receiving sensitivity. When the projecting portion 55 is gradually inserted into the recessed portion 56 due to the approach of the cutter 53 to the stopping position, and thus the amount of light reaching the light receiving portion 72 from the light emitting portion 71 is reduced, because the lower-limit product has a low light receiving sensitivity, the light receiving amount is reduced. Thus, the lower-limit product is an individual whose detection voltage becomes a high voltage (exceeds the threshold value H). Further, the intermediate product is a PI sensor 105C having intermediate characteristics of the upper-limit product and the lower-limit product.

For example, when the printer device 100 determines the rank depending on the individual variation of the PI sensor 105C, the printer device 100 drives the cutter motor 103 for a predetermined number of steps to move the cutter 53, to thereby measure the detection voltage of the PI sensor 105C in each step. Then, the printer device 100 determines the rank of the PI sensor 105C based on the tendency of the change in detection voltage for the predetermined number of steps. In this case, for example, the predetermined number of steps is defined as the number of steps at least required for the cutter 53 located at the stopping position to move to a position separated away from the stopping position. In this case, as an example, the predetermined number of steps is defined as 50 steps.

For example, the movement control unit 142 controls the drive of the cutter motor 103 for 50 steps. While the cutter 53 is moved for 50 steps through the drive control by the movement control unit 142, the measuring unit 141 measures the detection voltage output from the PI sensor 105C based on the movement of the cutter 53. The movement amount determining unit 143 determines the rank of the PI sensor 105C based on the tendency of the change in detection voltage while the cutter 53 is moved for 50 steps. The determination condition of the rank is, for example, the determination condition set in the rank determining table 145 shown in FIG. 7.

In the examples shown in FIG. 8 to FIG. 10, the PI sensor 105C being the upper-limit product is determined as the rank A because the number of drive steps in the detection voltage range within the section of the threshold value 4 or more and less than the threshold value 3 is a defined value or more (for example, 5 steps or more). Further, the PI sensor 105C being the intermediate product is determined as the rank B because the number of drive steps in the detection voltage range within the section of the threshold value 3 or more and less than the threshold value 2 is the defined value or more (for example, 5 steps or more). Further, the PI sensor 105C being the lower-limit product is determined as the rank C because the number of drive steps in the detection voltage range within the section of the threshold value 2 or more and less than the threshold value 1 is the defined value or more (for example, 5 steps or more) (or the detection voltage is the threshold value 1 or more under a state in which the cutter 53 is stopped).

The movement amount determining unit 143 determines the movement amount (number of steps) for moving the cutter 53 based on the rank of the PI sensor 105C, which is determined based on the tendency of the change in detection voltage. For example, when the detection voltage crosses the threshold value H while the cutter 53 is moving, the movement amount determining unit 143 determines the subsequent movement amount based on the determined rank of the PI sensor 105C. For example, when the detection voltage exceeds the threshold value H while the cutter 53 is moving from the cutting position (position separated away from the stopping position) in a direction toward the stopping position, the movement amount determining unit 143 subsequently determines the movement amount (number of steps) of the cutter 53 to the stopping position based on the determined rank of the PI sensor 105C. Further, when the detection voltage falls below the threshold value H while the cutter 53 is moving from the stopping position in a direction toward the cutting position (direction of separating away from the stopping position), the movement amount determining unit 143 subsequently determines the movement amount (number of steps) of the cutter 53 to the cutting position based on the determined rank of the PI sensor 105C.

For example, as the movement amount to the stopping position after the detection voltage exceeds the threshold value H, a defined amount (for example, "10 steps") and a correction amount are set. The correction amount is a value for use in correction from the defined amount based on the rank of the PI sensor 105C. The movement amount determining unit 143 determines the movement amount to the stopping position after the detection voltage exceeds the threshold value H based on the defined amount and the correction amount based on the rank of the PI sensor 105C.

FIG. 11 is a data example of the movement amount correcting table 146. In the movement amount correcting table 146, the correction amount for each rank of the PI sensor 105C is set. In the example shown in FIG. 11, a correction amount for the rank A is set to "7 steps", a correction amount for the rank B is set to "4 steps", and a correction amount for the rank C is set to "no correction". This correction amount corresponds to negative correction (that is, subtracting correction) when the cutter 53 is moving in a direction toward the stopping position. On the other hand, this correction amount corresponds to positive correction (that is, adding correction) when the cutter 53 is moving in a direction from the stopping position toward the cutting position.

For example, when the cutter 53 is moved in the direction toward the stopping position, the movement amount determining unit 143 sets the movement amount after the detection voltage exceeds the threshold value H to "(10 steps)−(7 steps)=(3 steps)" in the case of the PI sensor 105C of the rank A, to "(10 steps)−(4 steps)=(6 steps)" in the case of the PI sensor 105C of the rank B, and to "10 steps" in the case of the PI sensor 105C of the rank C.

As described above, the printer device 100 determines the rank depending on the individual variation of the PI sensor 105C, and corrects the movement amount of the cutter 53 based on the determined rank. As a result, even when the individual variation of the PI sensor 105 is large, reduction in detection accuracy can be suppressed.

Figure 12:
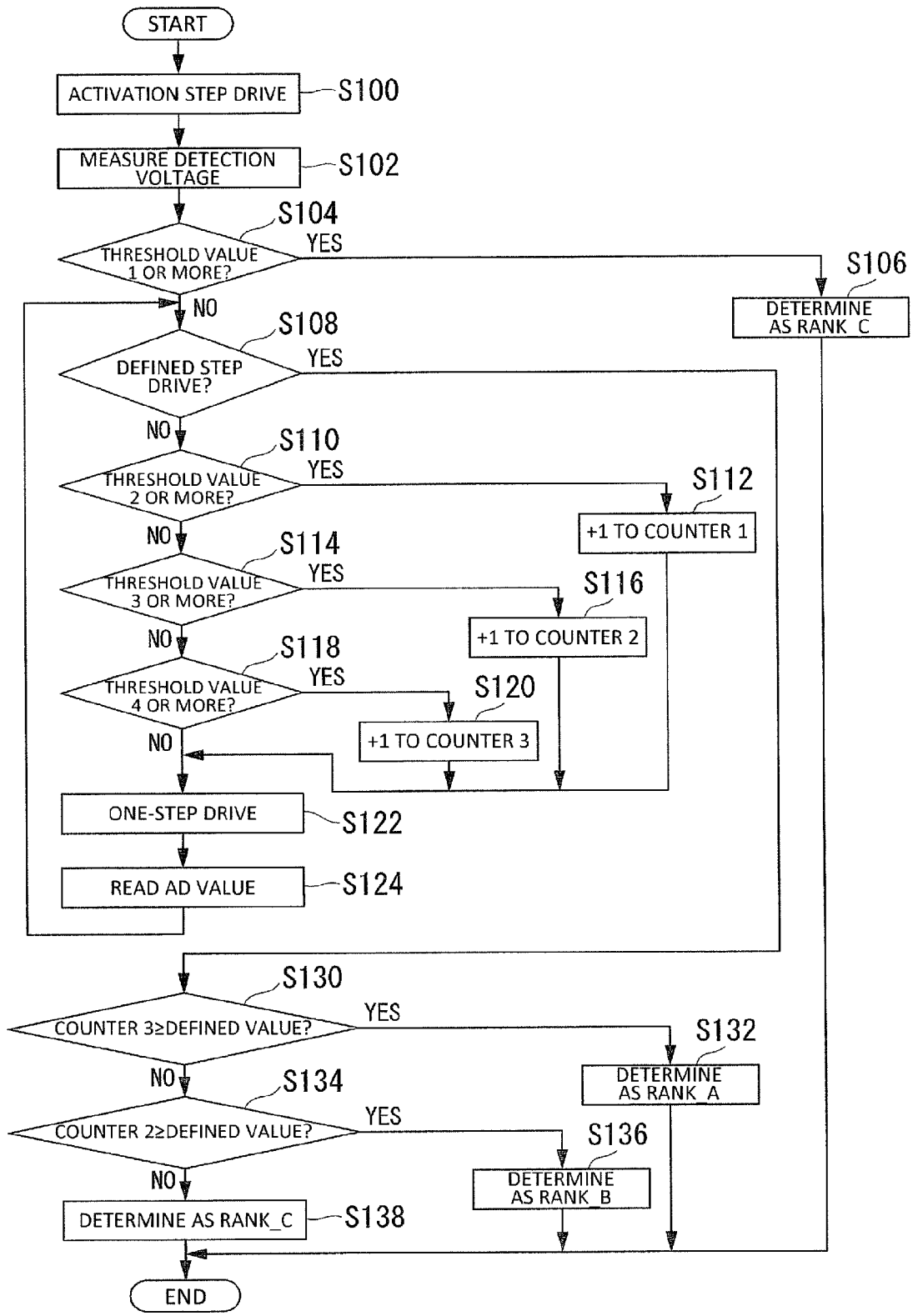
FIG. 12 is a flow chart for illustrating an example of a rank determination processing according to this embodiment.

Next, with reference to FIG. 12, description is given of the operation of rank determination processing of determining the rank depending on the individual variation of the PI sensor 105C in the cutter control processing according to this embodiment. FIG. 12 is a flow chart for illustrating an example of the rank determination processing according to this embodiment. This rank determination processing is started through execution of a command (cut command) for instruction on cutting the sheet, test printing, or the like.

First, as an activation step, the movement control unit 142 controls the drive of the cutter motor 103, to thereby control the cutter 53 to the stopping position (for example, position of the minimum distance ds) (Step S100). When the cutter 53 is originally stopped at the stopping position, the drive of the cutter motor 103 may be omitted.

Next, the measuring unit 141 reads the AD value of the detection voltage output from the PI sensor 105C, and passes, to the movement amount determining unit 143, the AD value of the detection voltage as the measurement result (Step S102).

The movement amount determining unit 143 determines whether or not the detection voltage is the threshold value 1 or more based on the measurement result received from the measuring unit 141 (Step S104). When it is determined that the detection voltage of the PI sensor 105C is the threshold value 1 or more (Step S104: YES), the movement amount determining unit 143 determines the rank of the PI sensor 105C as the rank C (Step S106).

On the other hand, under a state in which the cutter 53 is at the stopping position, when it is determined that the detection voltage of the PI sensor 105C is less than the threshold value 1 (Step S104: NO), the movement amount determining unit 143 determines whether or not the drive of the cutter motor 103 for moving the cutter 53 by the movement control unit 142 is performed for the defined number of steps (for example, 50 steps) (Step S108). Then, when it is determined that the drive is not performed for the defined number of steps (Step S108: NO), the movement amount determining unit 143 determines whether or not the detection voltage of the PI sensor 105C is the threshold value 2 or more (Step S110).

When it is determined that the detection voltage of the PI sensor 105C is the threshold value 2 or more (Step S110: YES), the movement amount determining unit 143 increases a count value of a counter 1 by 1 (+1), and proceeds the processing to Step S122 (Step S112). The counter 1 is a software counter configured to count the number of steps corresponding to the detection voltage that is the threshold value 2 or more and less than the threshold value 1 when the cutter 53 is moved, and is reset when this rank determination processing is started.

On the other hand, when it is determined that the detection voltage of the PI sensor 105C is less than the threshold value 2 (Step S110: NO), the movement amount determining unit 143 determines whether or not the detection voltage of the PI sensor 105C is the threshold value 3 or more (Step S114). When it is determined that the detection voltage of the PI sensor 105C is the threshold value 3 or more (Step S114: YES), the movement amount determining unit 143 increases a count value of a counter 2 by 1 (+1), and proceeds the processing to Step S122 (Step S116). The counter 2 is a software counter configured to count the number of steps corresponding to the detection voltage that is the threshold value 3 or more and less than the threshold value 2 when the cutter 53 is moved, and is reset when this rank determination processing is started.

On the other hand, when it is determined that the detection voltage of the PI sensor 105C is less than the threshold value 3 (Step S114: NO), the movement amount determining unit 143 determines whether or not the detection voltage of the PI sensor 105C is the threshold value 4 or more (Step S118). When it is determined that the detection voltage of the PI sensor 105C is the threshold value 4 or more (Step S118: YES), the movement amount determining unit 143 increases a count value of a counter 3 by 1 (+1), and proceeds the processing to Step S122 (Step S120). The counter 3 is a software counter configured to count the number of steps corresponding to the detection voltage that is the threshold value 4 or more and less than the threshold value 3 when the cutter 53 is moved, and is reset when this rank determination processing is started.

On the other hand, when it is determined that the detection voltage of the PI sensor 105C is less than the threshold value 4 (Step S118: NO), the movement amount determining unit 143 proceeds the processing to Step S122. Then, the movement control unit 142 drives the cutter motor 103 for one step (Step S122). The measuring unit 141 reads the AD value of the detection voltage output from the PI sensor 105C after the one-step drive, and passes, to the movement amount determining unit 143, the AD value of the detection voltage as the measurement result (Step S124). Then, the processing returns to Step S108.

Then, until it is determined in Step S108 that the cutter motor 103 is driven for a defined number of steps (for example, 50 steps), the processing of Step S108 to Step S122 is repeated, and the above-mentioned control based on the detection voltage is performed for each one-step drive of the cutter motor 103.

When it is determined in Step S108 that the cutter motor 103 is driven for the defined number of steps (for example, 50 steps) (Step S108: YES), the movement amount determining unit 143 proceeds the processing to Step S130 to determine whether or not the count number of the counter 3 is equal to or more than a defined value (for example, 5 steps).

When it is determined that the count number of the counter 3 is equal to or more than the defined value (for example, 5 steps) (Step S130: YES), the movement amount determining unit 143 determines the rank of the PI sensor 105C as the rank A (Step S132). That is, when the number of drive steps in the detection voltage range of the threshold value 4 or more and less than the threshold value 3 is the defined value or more, the PI sensor 105C is determined as the rank A.

On the other hand, when it is determined that the count number of the counter 3 is less than the defined value (for example, 5 steps) (Step S130: NO), the movement amount determining unit 143 determines whether or not the count number of the counter 2 is equal to or more than the defined value (for example, 5 steps) (Step S134).

When it is determined that the count number of the counter 2 is equal to or more than the defined value (for example, 5 steps) (Step S134: YES), the movement amount determining unit 143 determines the rank of the PI sensor 105C as the rank B (Step S136). That is, when the number of drive steps in the detection voltage range of the threshold value 3 or more and less than the threshold value 2 is the defined value or more, the PI sensor 105C is determined as the rank B.

On the other hand, when it is determined that the count number of the counter 2 is less than the defined value (for example, 5 steps) (Step S134: NO), the movement amount determining unit 143 determines the rank of the PI sensor 105C as the rank C (Step S138). In this case, the determination that the count number of the counter 2 is less than the defined value corresponds to the determination that the count number of the counter 1 is the defined value or more, and hence the PI sensor 105C is determined as the rank C.

After the processing of Step S134, processing of determining whether or not the count number of the counter 1 is the defined value or more may be added. In this case, when it is determined that the count number of the counter 1 is the defined value or more, the movement amount determining unit 143 may determine the rank of the PI sensor 105C as the rank C, and when it is determined that the count number of the counter 1 is less than the defined value, the movement amount determining unit 143 may define abnormality occurrence to perform error processing.

As described above, the printer device 100 according to this embodiment includes the movement control unit 142, the PI sensor 105C (example of a detecting unit), and the movement amount determining unit 143. The movement control unit 142 is configured to control the movement of the cutter 53 (example of an object). The PI sensor 105C is configured to optically detect the cutter 53, which is configured to move through the control by the movement control unit 142, at a specific position (for example, position for detecting the stopping position of the cutter 53) to output the detection voltage. The movement amount determining unit 143 is configured to determine the movement amount of the cutter 53 to be moved through the control by the movement control unit 142 based on the tendency of the change in detection voltage, which is output from the PI sensor 105C when the cutter 53 is moved.

In this manner, the printer device 100 corrects the movement amount of the cutter 53 based on the tendency of the change in detection voltage of the PI sensor 105C when the cutter 53 is moved. Thus, even when the PI sensor 105 having a large individual variation is used, reduction in detection accuracy can be suppressed. Further, the printer device 100 can be used even with the PI sensor 105 having a large individual variation, and hence cost reduction can be expected as compared to the case where the sensor having a small individual variation is used.

For example, the printer device 100 includes the measuring unit 141 configured to measure the detection voltage output from the PI sensor 105C based on the movement of the cutter 53 while the cutter 53 moves for a predetermined distance (for example, a defined number of steps: in the example of this embodiment, 50 steps) through the control by the movement control unit 142. For example, the movement amount determining unit 143 determines the distance for moving the cutter 53 (for example, a defined number of steps) as the movement amount of the cutter 53 based on the tendency of the change in detection voltage for the predetermined distance, which is measured by the measuring unit 141.

In this manner, the printer device 100 determines the number of steps for moving the cutter 53 based on the tendency of the change in detection voltage of the PI sensor 105C based on the drive steps of the cutter motor 103. Thus, even when the PI sensor 105 having a large individual variation is used, the movement amount of the cutter 53 can be appropriately controlled.

The printer device 100 may control the time for moving the cutter 53 as the control for moving the cutter 53 instead of controlling the distance for moving the cutter 53 (for example, the number of steps). For example, the measuring unit 141 may measure the detection voltage output from the PI sensor 105C based on the movement of the cutter 53 while the cutter 53 is moved for a predetermined time through the control by the movement control unit 142. Then, the movement amount determining unit 143 may determine the time for moving the cutter 53 as the movement amount of the cutter 53 based on the tendency of the change in detection voltage for the predetermined time, which is measured by the measuring unit 141.

Further, when the detection voltage of the PI sensor 105C crosses a predetermined threshold value (for example, threshold value H) during the movement of the cutter 53, the movement amount determining unit 143 determines the subsequent movement amount based on the tendency of the change in detection voltage. In this case, the case where the detection voltage of the PI sensor 105C crosses the threshold value H represents a case where the detection voltage is switched from High to Low or from Low to High, that is, a case where the projecting portion 55 is inserted into the recessed portion 56 so that the light from the light emitting portion 71 to the light receiving portion 72 is blocked by the projecting portion 55 or the blocked state is cancelled.

With this, even when the PI sensor 105 having a large individual variation is used, the printer device 100 can appropriately control the movement amount of the cutter 53 to the stopping position, and the movement amount to the position separated away from the stopping position.

For the PI sensor 105C, the rank based on the tendency of the change in detection voltage and the correction amount of the movement amount until the cutter 53 is stopped are set in association with each other. Then, the movement amount determining unit 143 determines the rank of the PI sensor 105C based on the tendency of the change in detection voltage of the PI sensor 105C, and determines the movement amount until the cutter 53 is stopped based on the correction amount associated with the determined rank.

In this manner, the printer device 100 ranks the individual variation of the PI sensor 105C and associates the rank with the suitable correction amount in advance. Thus, even when the PI sensor 105C having a large individual variation is used, the movement amount of the cutter 53 can be appropriately controlled based on the rank. As a result, the printer device 100 can move and stop the cutter 53 at the appropriate stopping position.

Further, when a predetermined command (for example, cut command) or test printing is executed, the movement amount determining unit 143 determines the movement amount of the cutter 53 to be moved through the control by the movement control unit 142 based on the tendency of the change in detection voltage when the cutter 53 is moved. With this, the printer device 100 can determine the rank of the PI sensor 105C and correct the movement amount during the normal operation of the printer device 100 without performing special operations or works. In this manner, the printer device 100 can automatically correct the influence by the individual variation of the PI sensor 105C with a simple method, and hence a correction function excellent in maintenance performance can be realized.

All or a part of the function of each unit included in the printer device 100 in the above-mentioned embodiment may be realized by recording a program for realizing this function in a computer-readable recording medium and causing a computer system to read and execute the program stored in this recording medium. The "computer system" as used herein includes an OS and hardware such as peripheral devices.

Further, the "computer-readable recording medium" refers to a portable medium such as a flexible disk, a magneto-optical disk, a ROM, and a CD-ROM or a storage unit such as a hard disk built in the computer system. Further, the "computer-readable recording medium" may include an entity for dynamically holding a program for a short period of time, e.g., a communication wire through which the program is transmitted via a network, e.g., the Internet or a communication line, e.g., a phone line, and also include an entity for holding a program for a certain period of time, e.g., a volatile memory inside the computer system serving as a server or a client in that case. Further, the program may realize a part of the above-mentioned function, or may realize the above-mentioned function in combination with programs already recorded in the computer system.

The embodiment of the present invention has been described above, but the present invention is not limited to the above-mentioned embodiment, and various modifications can be made thereto without departing from the gist of the present invention.

In this embodiment, description is given of an example in which the ranks of the PI sensors 105C are divided into 3 types, that is, the rank A, the rank B, and the rank C, to thereby determine the correction amount. However, the ranks of the PI sensors 105C are not limited to 3 types, and may be divided into 2 types or 4 types or more.

Further, in this embodiment, description is given of a configuration example in which the PI sensor 105C is provided at a position corresponding to the stopping position of the cutter 53, but the present invention is not limited thereto. The PI sensor 105C may be provided at a position corresponding to the cutting position of the cutter 53. In this case, the PI sensor 105C serves as the detecting unit configured to detect that the cutter 53 has moved to the cutting position.

Further, in this embodiment, description is given of an example of the movement control of the cutter 53, but the correction processing based on the tendency of the change in detection voltage of the optical sensor (in this embodiment, the PI sensor 105C) can be applied to control other than the movement control of the cutter 53. For example, when the optical sensors such as the PI sensor 105C are used to detect the presence or absence of the sheet, the position of the sheet, the opening or closing of the cover of the casing, and the like, the correction processing can be similarly applied based on the tendency of the change in detection voltage of the optical sensor according to this embodiment. That is, the object whose movement is controlled by the movement control unit 142 and the object to be detected by the optical sensor (in this embodiment, the PI sensor 105C) are not limited to the cutter 53, and may be any object including, for example, a sheet, a mark on the sheet, and the cover of the casing. Further, the printer device 100 is an example of a control device configured to perform correction processing based on the tendency of the change in detection voltage of the optical sensor according to this embodiment, and may be a device having a function different from the printer.

What is claimed is:

1. A control device, comprising:
    a movement control circuit configured to control movement of an object;
    a sensor configured to optically detect, at a specific position, the object moving through control by the movement control circuit, to thereby output a detection voltage;
    a movement amount determining circuit configured to determine a movement amount of the object circuit, based on a tendency of a change in the detection voltage when the object is moved; and
    a measuring circuit configured to measure the detection voltage output from the detecting circuit based on the movement of the object, while the object is moved for a predetermined distance,
    wherein the movement amount determining circuit is configured to determine a distance for moving the object as the movement amount based on a change in the detection voltage for the predetermined distance.

2. A control device according to claim 1, wherein the measuring circuit is further configured to measure the detection voltage output from the sensor based on the movement of the object, while the object is moved for a predetermined time through the control by the movement control circuit, and
    wherein the movement amount determining circuit is further configured to determine a time for moving the object as the movement amount based on the tendency of the change in the detection voltage for the predetermined time, which is measured by the measuring circuit.

3. A control device according to claim 1, wherein, when the detection voltage crosses a predetermined threshold value while the object is moving, the movement amount determining circuit determines a subsequent movement amount based on the tendency of the change in the detection voltage.

4. A control device according to claim 1, wherein, for the detecting circuit, a rank based on the tendency of the change in the detection voltage and a correction amount of the movement amount until the object is stopped are set in association with each other, and
    wherein the movement amount determining circuit is configured to: determine the rank of the sensor based on the tendency of the change in the detection voltage; and determine the movement amount until the object is stopped based on the correction amount associated with the determined rank.

5. A control device according to claim 1, wherein, when one of a predetermined command and test printing is executed, the movement amount determining circuit determines the movement amount of the object to be moved through the control by the movement control circuit, based on the tendency of the change in the detection voltage when the object is moved.

6. A control method for a control device, the control method comprising:
    controlling movement of an object by a movement control circuit;
    acquiring, by a measuring circuit, a detection voltage output from a sensor configured to optically detect, at a specific position, the object configured to move through control by the movement control circuit; and
    determining, by a movement amount determining circuit, a movement amount of the object moved through the control by the movement control circuit, based on a change in the detection voltage when the object is moved; and
    measuring the detection voltage output from the detecting circuit based on the movement of the object, while the object is moved for a predetermined distance,
    wherein the movement amount determining circuit is configured to determine a distance for moving the object as the movement amount based on a change in the detection voltage for the predetermined distance.

7. A control method according to claim 6, wherein measuring the detection voltage output from the sensor further comprises measuring the detection voltage output from the sensor while the object is moved for a predetermined time, and
    wherein the movement amount determining circuit is further configured to determine a time for moving the object as the movement amount based on a change in the detection voltage for the predetermined time.

* * * * *